(12) United States Patent
Lefevre et al.

(10) Patent No.: US 7,714,940 B2
(45) Date of Patent: May 11, 2010

(54) METHOD AND APPARATUS FOR SELECTING DEVICES ON A DATA BUS

(75) Inventors: Chad Andrew Lefevre, Indianapolis, IN (US); James Duane Tenbarge, Fishers, IN (US); Khelan Maheshchandra Modi, Indianapolis, IN (US)

(73) Assignee: Thomson Licensing, Boulogne Billancourt (FR)

( * ) Notice: Subject to any disclaimer, the term of this patent is extended or adjusted under 35 U.S.C. 154(b) by 605 days.

(21) Appl. No.: 10/512,361

(22) PCT Filed: Apr. 22, 2003

(86) PCT No.: PCT/US03/12377

§ 371 (c)(1),
(2), (4) Date: Oct. 25, 2004

(87) PCT Pub. No.: WO03/092275

PCT Pub. Date: Nov. 6, 2003

(65) Prior Publication Data

US 2006/0059275 A1     Mar. 16, 2006

Related U.S. Application Data

(60) Provisional application No. 60/375,271, filed on Apr. 24, 2002.

(51) Int. Cl.
*H04N 5/44* (2006.01)

(52) U.S. Cl. .................. 348/734; 348/552; 340/825.72

(58) Field of Classification Search .................. 348/734, 348/705–706, 731, 460, 552–554; 340/825.69, 340/825.72, 825.22, 825.24; 715/717–718, 715/714, 716, 719
See application file for complete search history.

(56) References Cited

U.S. PATENT DOCUMENTS 5,598,523 A     1/1997  Fujita
5,936,667 A  *  8/1999  Saib et al. ................... 348/180

(Continued)

FOREIGN PATENT DOCUMENTS

EP          0737006        10/1996

(Continued)

OTHER PUBLICATIONS

Search Report Dated Aug. 8, 2003.

*Primary Examiner*—Trang U Tran
(74) *Attorney, Agent, or Firm*—Robert D. Shedd; Joseph J. Opalach; Reitseng Lin (57) ABSTRACT

A method and apparatus enables a user to assign a given key on an input device to any specific device on a data bus network connected to the apparatus, and thereby enables the user to quickly select the specific device for control using the given key. According to an exemplary embodiment, the method includes steps of enabling a user to assign a key on an input device of the apparatus to a device on the data bus network that is indirectly connected to the apparatus, and enabling the user to select the device for control responsive to an input of the assigned key.

17 Claims, 4 Drawing Sheets

U.S. PATENT DOCUMENTS

| | | | |
|---|---|---|---|
| 6,288,716 B1 * | 9/2001 | Humpleman et al. | 715/733 |
| 6,526,579 B2 * | 2/2003 | Sato | 725/58 |
| 6,567,011 B1 * | 5/2003 | Young et al. | 340/825.69 |
| 6,748,462 B2 * | 6/2004 | Dubil et al. | 710/8 |
| 6,930,730 B2 * | 8/2005 | Maxon et al. | 348/734 |
| 7,053,811 B2 * | 5/2006 | Aratani et al. | 341/173 |
| 7,324,168 B2 * | 1/2008 | Griesau et al. | 348/734 |

FOREIGN PATENT DOCUMENTS

| | | |
|---|---|---|
| EP | 1113442 | 7/2001 |
| JP | 2001128263 A | 5/2001 |
| JP | 2001204089 A | 7/2001 |
| JP | 2001309248 A | 11/2001 |
| JP | 2002078040 A | 3/2002 |
| WO | WO 02/01853 | 1/2002 |

\* cited by examiner

METHOD AND APPARATUS FOR SELECTING DEVICES ON A DATA BUS

This application claims the benefit, under 35 U.S.C. §365 of International Application PCT/US03/12377, filed Apr. 22, 2003, which was published in accordance with PCT Article 21(2) on Nov. 6, 2003 in English and which claims the benefit of U.S. Provisional Patent Application No. 60/375,271, filed Apr. 24, 2002.

BACKGROUND OF THE INVENTION

1. Field of the Invention

The present invention generally relates to a video signal processing apparatus and a method for controlling a video signal processing apparatus, and more particularly, to an apparatus and a method for enabling a user to assign a given key on an input device to any specific device on a data bus network connected to the apparatus, and reconfigure the input device to be associated with the selected device, to thereby enable the user to quickly select and control the specific device using the given key.

2. Background Information

A data bus can be utilized for interconnecting electronic devices, such as television signal receivers, personal computers, display devices, video cassette recorders (VCRs), digital versatile disk (DVD) players, direct broadcast satellite (DBS) receivers, home control devices (e.g., security systems, temperature control devices, etc.), and/or other devices. Communication using a data bus typically occurs in accordance with a specified bus protocol. An example of such a bus protocol includes the Institute for Electrical and Electronic Engineers 1394 High Performance Serial Bus protocol (IEEE 1394, or Firewire™), which is generally known in the art.

With a data bus, such as an IEEE 1394 bus, a network of interconnected devices can be created and a user may for example control one device on the network through inputs to another device on the network. Accordingly, an IEEE 1394 bus can provide interoperability among devices connected to the bus. An IEEE 1394 bus can also accommodate a relatively large number of interconnected devices (e.g., up to 63). However, as additional devices are added to the network, it can become increasingly difficult for users to select and thereby control a specific device. For example, as a network expands, a VCR that was once the second device on the network may later become the twelfth device on the network. Accordingly, there is a need for a technique that enables a user to select for control a specific device connected to a data bus, such as an IEEE 1394 bus, and preferably a technique that readily accommodates the addition and/or removal of devices from the network.

One approach for enabling a user to select a specific device connected to a data bus network, such as an IEEE 1394 bus network, is to provide an on-screen list which is updated as devices are added (i.e., connected) to, and removed (i.e., disconnected) from the bus network. For example, when a device is added to an existing IEEE 1394 bus network, the added device is recognized by every other network device and is added to a list of network devices that is maintained by every other network device. Similarly, when a device is removed from an existing IEEE 1394 bus network, the removal of that device is recognized by every other network device and that device is thereby removed from the list of network devices.

Accordingly, in order to select any specific network device at any given time, a user may access an on-screen display of the current list of network devices through another apparatus connected to the network, and scroll through the list to thereby select the specific device. This approach, however, has disadvantages since a user may have to scroll through a very long list of devices every time he or she wants to select a commonly used device.

Accordingly, there is a need for a method and apparatus, which avoids the foregoing problems, and thereby enables a user to quickly select for control any specific device on a data bus network, such as an IEEE 1394 bus network, connected to the apparatus. The present invention addresses these and other issues.

SUMMARY OF THE INVENTION

In accordance with an aspect of the present invention, a method for controlling an apparatus connected to a data bus network is disclosed. According to an exemplary embodiment, the method comprises steps of: coupling the apparatus to a peripheral device via a data bus network connection, wherein the data bus network connection can be used to connect a plurality of peripheral devices to the apparatus; receiving identification information from the peripheral device during a set up mode; providing an on-screen display for allowing a user to associate a selected key on a user input device associated with the apparatus with the peripheral device coupled to the data bus network connection; associating the selected key on the user input device with the peripheral device coupled to the data bus network connection in response to user input; coupling an output of the peripheral device to a display device associated with the apparatus in response to user actuation of the selected key on the user input device; and configuring the user input device to control the peripheral device in response to user actuation of the selected key.

In accordance with another aspect of the present invention, an apparatus capable of performing the above-stated method is disclosed. According to an exemplary embodiment, the apparatus comprises: an input/output terminal for connecting a plurality of peripheral devices to the apparatus and to a data bus network; means for providing on-screen display signals; means for coupling video signals to a display device; means for generating user input signals in response to user actuation of a selected one of plurality of keys; a processor, coupled to the input/output terminal, for receiving video signals from devices connected to the data bus network and providing output signals suitable for display; and means for coupling the output signals to a display device, wherein the providing means provides an on-screen display for allowing a user to associate a selected key on the generating means with a selected peripheral device connected to the data bus network, whereby the processing means and coupling means couple the output of the selected peripheral device to the display device, and the generating means is configured to control the selected peripheral device in response to user actuation of the selected key.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

The exemplifications set out herein illustrate preferred embodiments of the invention, and such exemplifications are not to be construed as limiting the scope of the invention in any manner.

DESCRIPTION OF THE PREFERRED EMBODIMENTS

Figure 1:
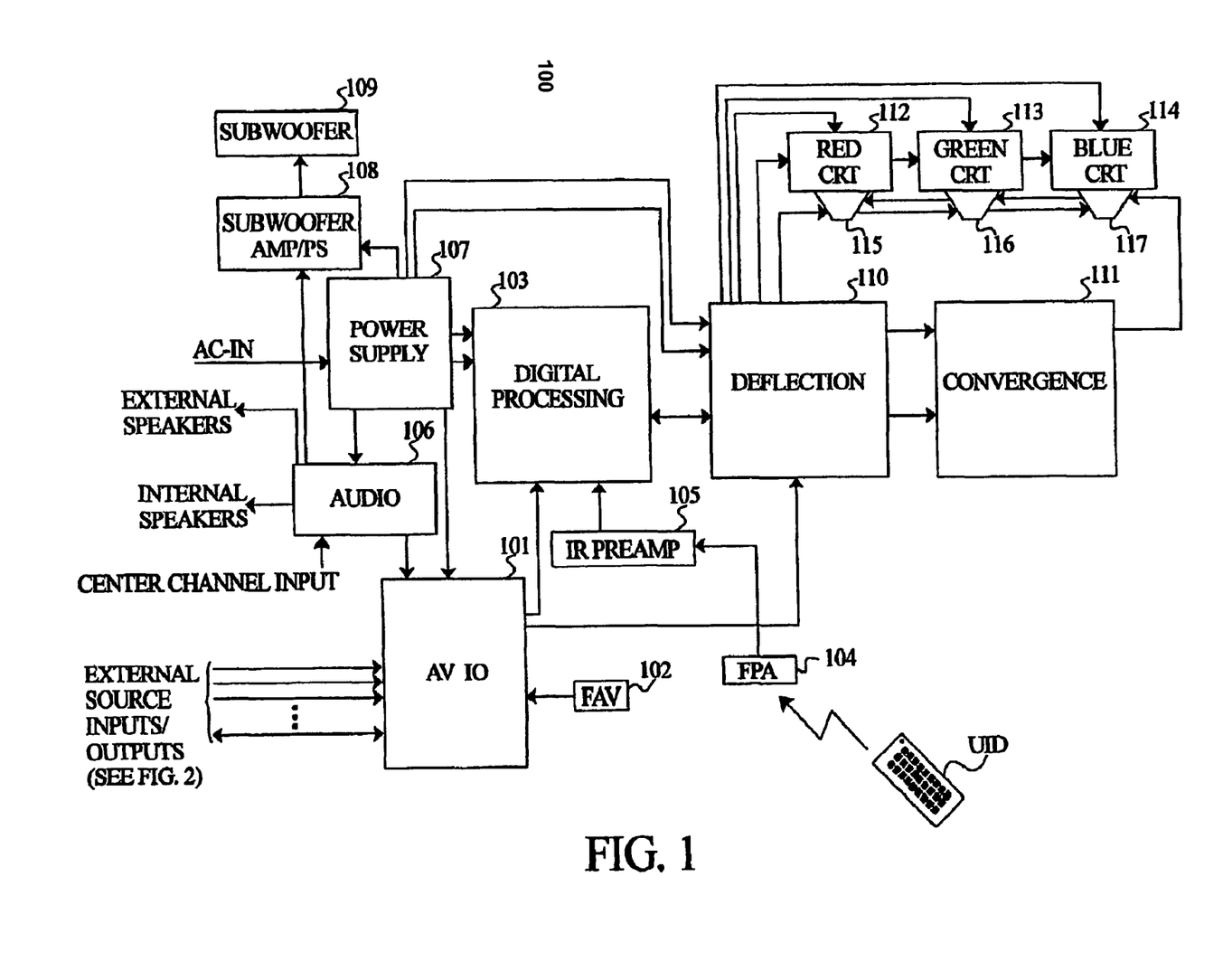
FIG. 1 is an exemplary apparatus suitable for implementing the present invention.

Referring now to the drawings, and more particularly to FIG. 1, an exemplary apparatus 100 suitable for implementing the present invention is shown. For purposes of example and explanation, apparatus 100 represents an exemplary portion of a television signal receiver embodied as a projection screen television. However, it will be intuitive to those skilled in the art that principles of the present invention may be applied to other apparatuses that perform the functions described below.

As shown in FIG. 1, apparatus 100 comprises an audio/video input/output (AV 10) block 101, a front audio/video (FAV) connector 102, a digital processing block 103, a front panel assembly (FPA) 104, an infrared (IR) preamp 105, an audio block 106, a power supply 107, a subwoofer amp/power supply 108, a subwoofer 109, a deflection block 110, a convergence block 111, CRTs 112 to 114, and yokes 115 to 117. The foregoing elements of FIG. 1 are operatively coupled as indicated by the data lines shown in FIG. 1. As will be intuitive to those skilled in the art, many of the elements, or combinations of elements, represented in FIG. 1 may be embodied using integrated circuits (ICs).

AV IO block 101 comprises various input terminals, including, but not limited to, S-video inputs, RF inputs, component inputs, and IEEE 1394 input, and is operative to receive and process audio, video, control and/or other inputs, and to output processed signals to other elements of apparatus 100, as indicated in FIG. 1. According to an exemplary embodiment, AV IO block 101 receives audio, video, and/or control inputs from a plurality of external sources such as, but not limited to, the devices represented in FIG. 2.

Figure 2:
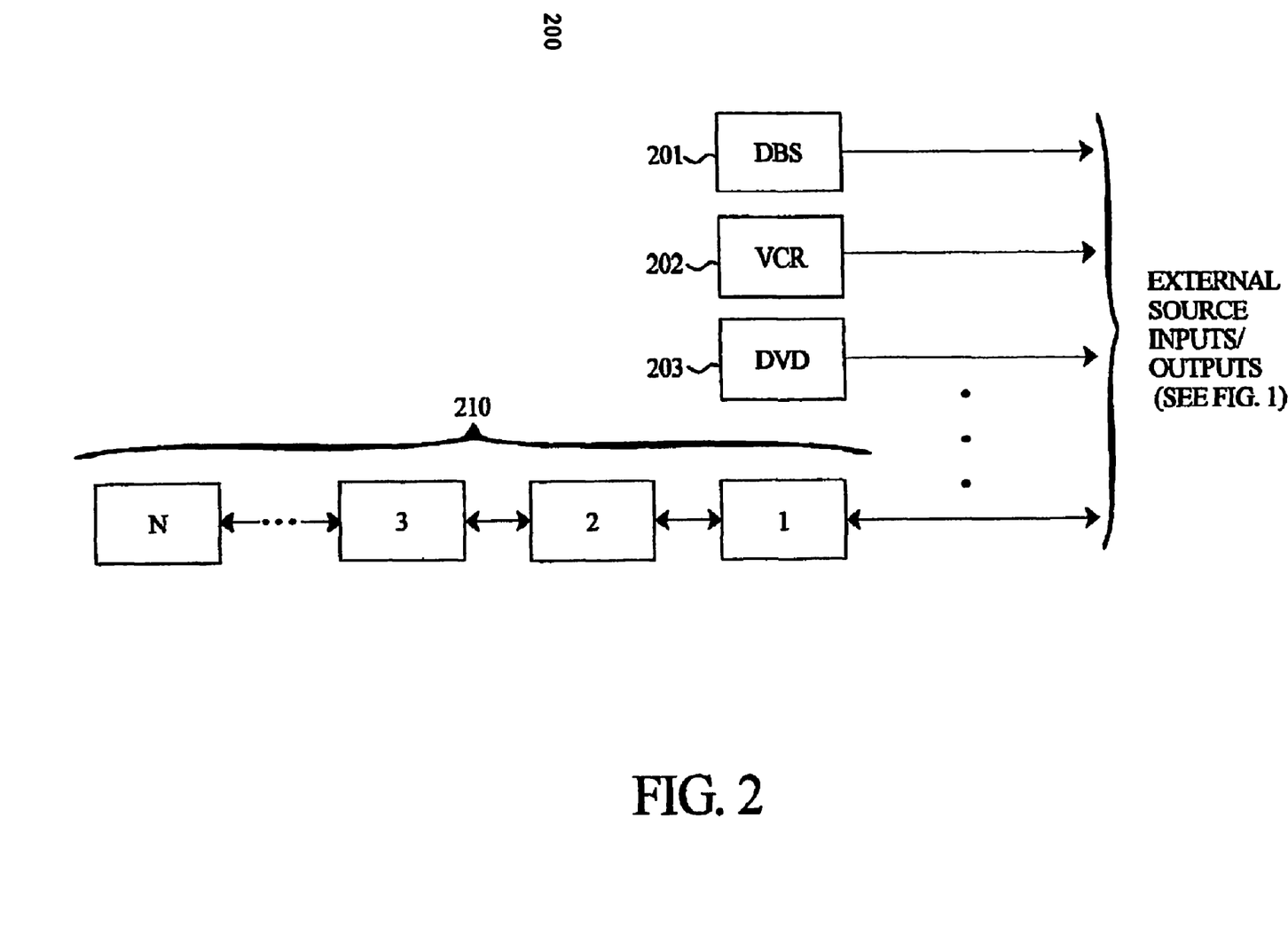
FIG. 2 is a diagram illustrating an exemplary connection of devices to the apparatus of FIG. 1.

As indicated in FIGS. 1 and 2, AV IO block 101 receives audio, video and/or other inputs from external devices 201 to 203, which for purposes of example are represented in FIG. 2 as a DBS receiver, a VCR, and a OVD player, respectively. Other external devices may be connected to AV IO block 101, and the number of such devices may for example depend on the number of input terminals provided by AV IO block 101.

AV IO block 101 is operatively coupled to at least one bi-directional digital data bus network 210 (see FIG. 2), such as an IEEE 1394 bus network, or the like. As indicated in FIG. 2, data bus network 210 includes up to N interconnected devices (e.g., television signal receivers, personal computers, display devices, VCRs, DVD players, DBS receivers, and/or other devices), which are capable of communicating with one another in a known manner, such as in accordance with the IEEE 1394 bus protocol. According to an exemplary embodiment, N is equal to sixty-three (63). Apparatus 100 may exchange audio, video, control, and/or other signals with any of the devices on data bus network 210 via AV IO block 101. Data bus network 210 may be arranged in a variety of different configurations such as, but not limited to, the exemplary configuration shown in FIG. 2, and/or other configurations.

AV IO block 101 also receives processed audio inputs from audio block 106. According to an exemplary embodiment, AV IO block 101 processes inputs and outputs composite video signals and all audio signals to digital processing block 103 for additional processing, while outputting component video signals (e.g., 2H, 2.14H, Y, Pr, Pb video information) to deflection block 110. FAV connector 102 is operative to provide audio and/or video inputs to AV IO block 101.

Digital processing block 103 is operative to perform various digital functions of apparatus 100, such as tuning, demodulation, signal decompression, memory and other functions. Digital processing block 103 outputs processed video signals to deflection block 110 which enable a visual display. As will be explained later herein, digital processing block 103 also enables, among other things, a user to assign a given key on a user input device (UID) to a specific device on data bus network 210, and thereby enables the user to quickly select the specific device for control using the given key.

FPA 104 is an interface operative to receive user inputs from a UID, such as an IR hand-held remote control, keyboard, or other input device, and to output signals corresponding to the user inputs to IR preamp 105. As will be explained later herein, a user may assign a given key of the UID to a specific device on data bus network 210, and thereby quickly select the specific device for control using the given key. IR preamp 105 is operative to amplify the signals provided from FPA 104 for output to digital processing block 103.

Audio block 106 is operative to perform various audio processing functions, and to output processed audio signals. According to an exemplary embodiment, audio block 106 receives a center channel input signal and processes the same to generate audio output signals. As indicated in FIG. 1, audio block 106 is operative to provide audio output signals to both external and internal speakers of apparatus 100. Additionally, audio block 106 provides audio output signals to AV IO block 101, and also provides subwoofer audio signals to subwoofer amp/power supply 108.

Power supply 107 is operative to receive an input alternating current power signal (AC-IN), and to output voltage signals which power the various elements of apparatus 100, as indicated in FIG. 1. According to an exemplary embodiment, power supply 107 provides such voltage signals to AV IO block 101, digital processing block 103, audio block 106, subwoofer amp/power supply 108, and deflection block 1 10. Subwoofer amp/power supply 108 is operative to amplify the subwoofer audio signals provided from audio block 106, and provide the amplified subwoofer audio signals to subwoofer 109. Subwoofer amp/power supply 108 also outputs a voltage signal to subwoofer 109, which serves as its power supply. Subwoofer 109 is operative to aurally output the amplified subwoofer audio signals provided from subwoofer amp/power supply 108.

Deflection block 110 is operative to control deflection functions of apparatus 100. According to an exemplary embodiment, deflection block 110 outputs deflection control signals to yokes 115 to 117, which control horizontal and vertical deflection of the high-intensity beams generated by CRTs 112 to 114, respectively. Deflection block 110 is also operative to output color control signals to CRTs 112 to 114 responsive to the processed video signals and other control signals provided from digital processing block 103. Also according to an exemplary embodiment, deflection block 110 is operative to output voltage signals to convergence block 111 and CRTs 112 to 114 for their power supplies.

Convergence block 111 is operative to control convergence functions of apparatus 100. According to an exemplary embodiment, convergence block 11 outputs convergence control signals to yokes 115 to 117, as indicated in FIG. 1, which control a positive convergence adjustment for precisely focusing the high-intensity beams emitted from CRTs 112 to 114 on a screen (not shown).

CRTs 112 to 114 are operative to generate high-intensity red, green and blue beams, respectively, for display on a screen responsive to the color control signals from deflection block 110. Yokes 115 to 117 are operative to control CRTs 112 to 114, respectively, responsive to the deflection control signals from deflection block 110 and the convergence control signals from convergence block 111. Other suitable display devices, including, but not limited to, LCDs, plasma displays, OLEDs, and DLP displays may be used.

Figure 3:
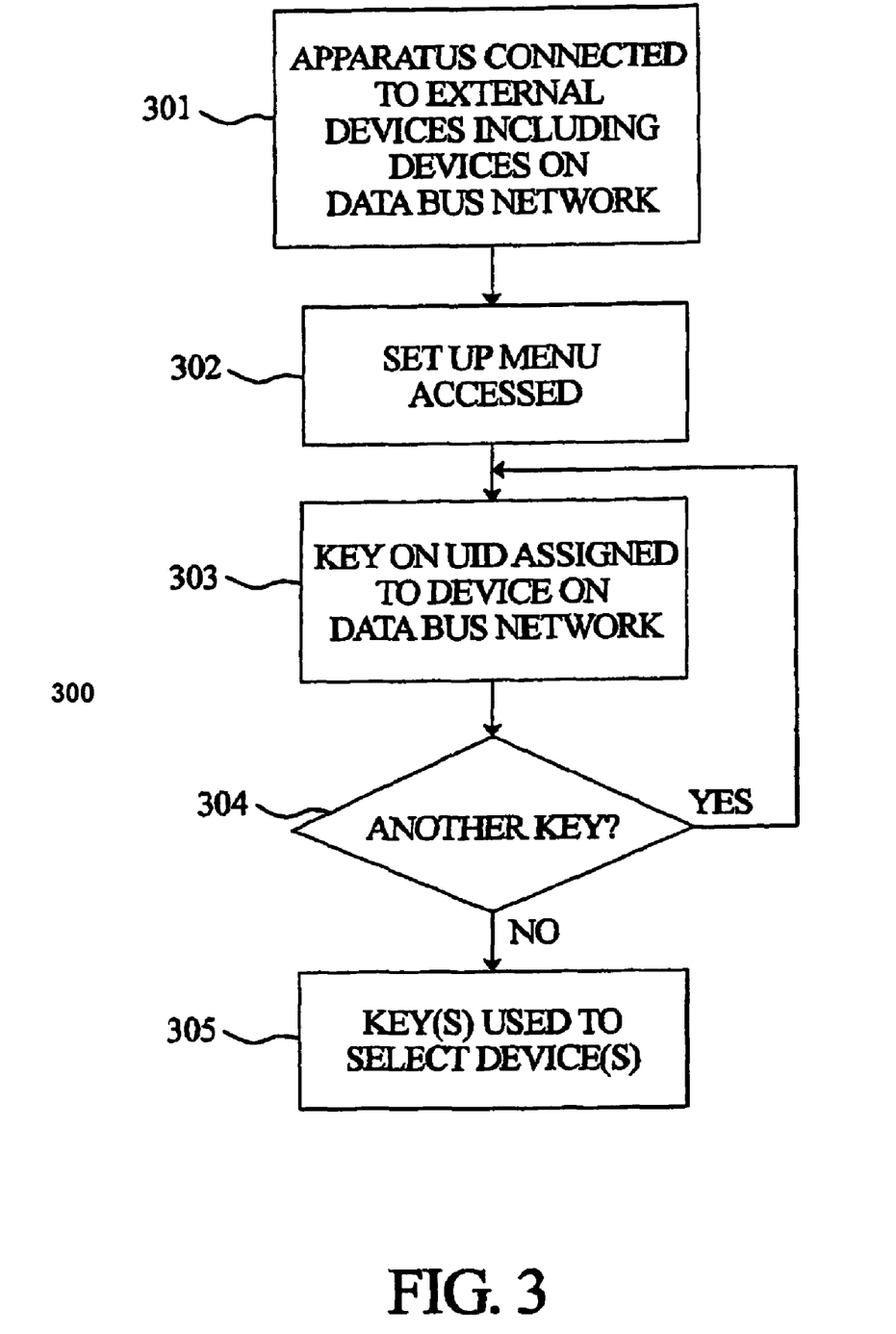
FIG. 3 is a flowchart illustrating exemplary steps according to the present invention.

Turning now to FIG. 3, a flowchart 300 illustrating exemplary steps according to one aspect of the present invention is shown. For purposes of example and explanation, the steps of FIG. 3 will be described with reference to apparatus 100 of FIG. 1 and the exemplary external devices of FIG. 2. Accordingly, the steps of FIG. 3 are merely exemplary, and are not intended to limit the present invention in any manner.

At step 301, apparatus 100 is connected to external devices including devices on data bus network 210. According to an exemplary embodiment, a user physically connects devices 201 to 203 of FIG. 2 to input terminals of AV IO block 101 in a conventional manner, and thereby enables devices 201 to 203 to provide audio and/or video input signals to apparatus 100. Also at step 301, the user constructs data bus network 210 of FIG. 2 by physically connecting devices 1 to N in a desired configuration, and connecting one of the devices on data bus network 210 to an input/output terminal (e.g., IEEE 1394 terminal) of AV IO block 101. As previously indicated herein, data bus network 210 may be arranged in a variety of different configurations such as, but not limited to, the exemplary configuration shown in FIG. 2, and/or other configurations.

According to an exemplary embodiment, apparatus 100 detects each device as it is connected to data bus network 210 including its need for a secondary analog connection at step 301. The operation of the bus network in recognizing and adding new devices to, or removing devices from, the network is well known. Generally, upon connection to the network, the network undergoes a configuration process, wherein each device on the network 210 provides identification data and control data, including manufacturer name, model name, identifiers including the GUID and EUID, and the various outputs and capabilities of the device, as necessary for configuring the network. Such data is generally stored in a configuration ROM of each device. Such data also indicates whether that particular device requires a secondary analog connection to apparatus 100. Apparatus 100, or a designated device on the network, stores this data (e.g., in memory of digital processing block 103) and updates it accordingly as devices are connected to and/or disconnected from data bus network 210. In this manner, apparatus 100 keeps track of all devices connected to it on data bus network 210 at any given time, including their requirements for a secondary analog connection. At this point the user may connect the analog outputs of the peripheral devices to any of the available analog inputs of apparatus 100.

After apparatus 100 is connected to the external devices at step 301, process flow advances to step 302 where a set up menu of apparatus 100 is accessed by a user. In particular, the set up menu accessed at step 302 enables the user to assign a given key on the UID to a specific device on data bus network 210, and thereby enables the user to quickly select the specific device using the given key. According to an exemplary embodiment, the user accesses the set up menu at step 302 by providing inputs to apparatus 100 via the UID which enable him/her to select from among various on-screen menus provided by apparatus 100. Such menus may for example be stored in memory of digital processing block 103. Digital processing block 103 responds to the user inputs by enabling generation of the various on-screen menus, which are displayed via CRTs 112 to 114. In this manner, the user may select the particular on-screen menu of apparatus 100 that enables the user to assign a given key on the UID to a specific device on data bus network 210. An example of such an on-screen menu 400 is shown in FIG. 4.

At step 303, a key on the UID is assigned to a specific device on data bus network 210 by the user. According to an exemplary embodiment, the user makes the key assignment at step 303 by providing inputs to apparatus 100 via the UID responsive to the on-screen menu accessed at step 302. One important aspect of the present invention is the ability for a user to assign a key on the UID to a specific device on data bus network 210, other than a device, which is directly connected to apparatus 100, such as device 1 of data bus network 210 in FIG. 2. That is, the present invention enables a user to assign a key on the UID to any device on data bus network 210, including devices which are indirectly connected to apparatus 100, such as devices 2 to N of data bus network 210 in FIG. 2. Apparatus 100 generates a table associating the each device connected to data bus network 210 with a unique index identifier. Each device can be uniquely identified by the identification information, such as the EUID, received during a set up mode of the data bus network 210. The apparatus 100 may then generate a second table associating the index identifier with a key on the UID, wherein actuation of the key results in the output of the selected device being coupled to the apparatus 100 and the UID being configured to control the selected device. Alternatively, the selected key on the UID may be associated directly with the identification information received during the set up mode.

Figure 4:
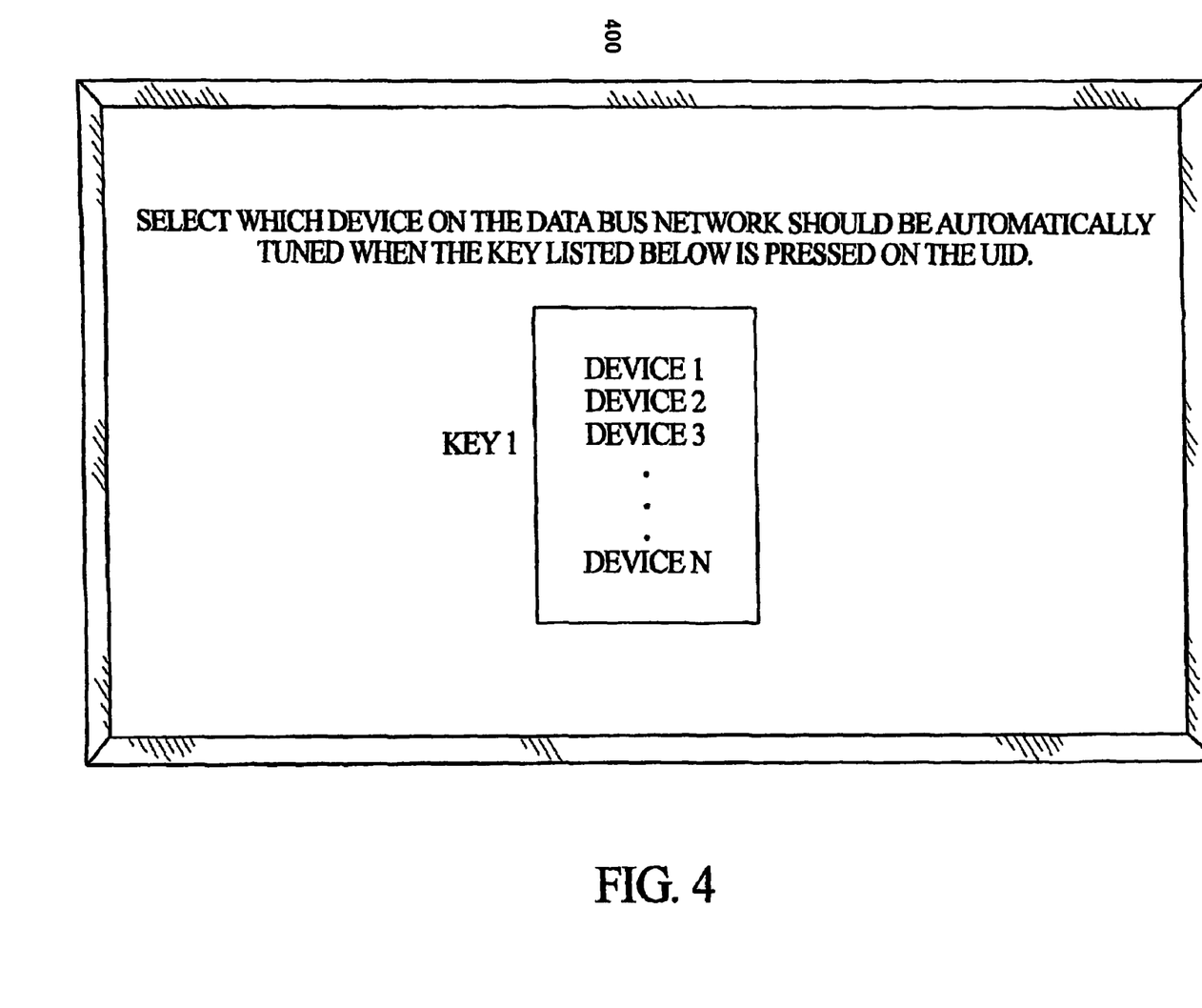
FIG. 4 is an exemplary on-screen menu suitable for use according to the present invention.

As indicated by exemplary on-screen menu 400 of FIG. 4, the user may for example scroll through the list of all devices (e.g., DEVICES 1 to N) connected on data bus network 210 to thereby select a device on data bus network 210 to be associated with a given key (e.g., KEY 1) on the UID. According to an exemplary embodiment, digital processing block 103 detects the user selection and stores data responsive thereto. In this manner, digital processing block 103 associates the given key on the UID to a specific device on data bus network 210. On-screen menu 400 is only an example, and other menu items such as context sensitive help information, and/or other items may also be provided and/or other formats used in on-screen menu 400 according to the present invention.

At step 304, the user is provided an option to assign another key on the UID to another device on data bus network 210. For example, the user may interact with on-screen menu 400 of FIG. 4 in order to assign another key (e.g., KEY 2, etc.) on the UID to another device on data bus network 210. In practice, the keys on UID may for example have descriptive names (e.g., VCR, DVD, DBS, etc.), which enable users to readily associate a key to a specific device.

If the decision at step 304 is affirmative, process flow loops back to step 303 where another key on the UID is assigned to another device on data bus network 210 in the manner described above. Accordingly, steps 303 and 304 may be repeated a number of times depending on, for example, the number of assignable keys available on the UID and/or the number of keys of the UID that the user wants to assign.

If the decision at step 304 is negative, process flow advances to step 305 where the assigned key(s) on the UID may be used by the user to select the corresponding device(s)

on data bus network 210 for control. According to an exemplary embodiment, a user's depression of an assigned key on the UID causes digital processing block 103 to output via AV IO block 101 one or more control signals to the corresponding device on data bus network 210. Such control signals initialize (e.g., "wake up") the device so that it is then immediately ready to receive and execute control commands (e.g., play, rewind, stop, etc.) provided over data bus network 210 by the user via the UID. In this manner, a user may quickly select a device on data bus network 210 by pressing only a single key on the UID, and then immediately provide control commands to the selected device. As previously indicated herein, the present invention is particularly useful for selecting and controlling devices on data bus network 210 that are indirectly connected to apparatus 100, namely devices 2 to N of data bus network 210.

As described herein, the present invention provides a method and apparatus which, among other things, enables a user to assign a given key on an input device to any specific device on a data bus network connected to the apparatus, and thereby enables the user to quickly select the specific device for control using the given key. The present invention is also advantageous since, for example, it readily accommodates the addition and/or removal of devices from a data bus network.

The present invention is particularly applicable to various video signal-processing apparatuses. The present invention is applicable to various electronic apparatuses that perform the various signal processing functions described hereinabove. Accordingly, the phrase "television signal receiver" as used herein may refer to systems or apparatuses including, but not limited to, television sets, computers, monitors, set-top boxes, VCRs, DVD players, stereos, video game boxes, personal video recorders (PVRs), and/or other apparatuses. Further, although an exemplary embodiment has been described, it is clear to those skilled in the art that the functions described above can be implemented using various elements, or combination of elements, including microprocessors, memory elements, device control elements, and software elements as required.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

The invention claimed is:

1. A method for controlling a video signal processing apparatus, comprising the steps of:
    coupling the apparatus to a plurality of peripheral devices via a data bus network connection;
    receiving identification information from each of the peripheral devices during a set up mode;
    providing an on-screen display for allowing a user to assign selected keys on a remote control device associated with the apparatus to control the peripheral devices;
    assigning the selected keys on the remote control device to control the peripheral devices in response to user inputs, wherein the user can assign any one of the selected keys to control any one of the peripheral devices according to the user's choice; and
    coupling an output of a selected one of the peripheral devices to a display device associated with the apparatus and configuring the remote control device to control the selected peripheral device in response to user actuation of the selected key assigned to control the selected peripheral device.

2. The method of claim 1, wherein the receiving step comprises entering the set up mode each time one of the peripheral devices is coupled to the apparatus via the data bus network connection.

3. The method of claim 2, wherein the receiving step further comprises generating a table associating each of the peripheral devices on the data bus network with a unique identifier.

4. The method of claim 3, wherein the assigning step comprises generating a second table associating the selected keys of the remote control device with the unique identifiers associated with the peripheral devices.

5. The method of claim 4, wherein the data bus network comprises an IEEE 1394 network.

6. The method of claim 3, wherein the assigning step further comprises maintaining the assignments of the selected keys of the remote control device to control the peripheral devices even when the ordering of the plurality of peripheral devices is rearranged on the data bus network.

7. A video signal processing apparatus, comprising:
    an input/output terminal for connecting a plurality of peripheral devices to the apparatus and to a data bus network;
    means for providing on-screen display signals;
    a processor, coupled to the input/output terminal, for receiving video signals from the peripheral devices connected to the data bus network and providing output signals suitable for display; and
    means for coupling the output signals to a display device, wherein the providing means provides an on-screen display for allowing a user to assign selected keys on a remote control device to control selected said peripheral devices connected to the data bus network such that the user can assign any one of the selected keys to control any one of the peripheral devices according to the user's choice, wherein the processor and coupling means couple an output of a selected one of the peripheral devices to the display device and the remote control device is configured to control the selected peripheral device in response to user actuation of the selected key assigned to control the selected peripheral device.

8. The video signal processing apparatus of claim 7, wherein the processor receives identification information from each of the peripheral devices connected to the data bus network during a set up mode of the data bus network, and the providing means provides an on-screen display including the identification information received during the set up mode.

9. The video signal processing apparatus of claim 8, wherein the processor generates a table associating each of the peripheral devices on the data bus network with a unique identifier.

10. The video signal processing apparatus of claim 9, wherein the processor generates a second table associating the selected keys of the remote control device with the unique identifiers associated with the peripheral devices.

11. The video signal processing apparatus of claim 10, wherein the processor maintains the assignments of the selected keys of the remote control device to control the peripheral devices even when the ordering of the plurality of peripheral devices is rearranged on the data bus network.

12. The video signal processing apparatus of claim 10, wherein the data bus network comprises an IEEE 1394 network.

13. A television receiver, comprising:

an input/output terminal for connecting a plurality of peripheral devices to the television receiver and to a data bus network;

means for providing on-screen display signals;

a processor, coupled to the input/output terminal, for receiving television signals from the peripheral devices connected to the data bus network and providing output signals suitable for display; and means for coupling the output signals to a display device, wherein the providing means provides an on-screen display for allowing a user to assign selected keys on a remote control device to control selected said peripheral devices connected to the data bus network such that the user can assign any one of the selected keys to control any one of the peripheral devices according to the user's choice wherein the processor and coupling means couple an output of a selected one of the peripheral devices to the display device and the remote control device is configured to control the selected peripheral device in response to user actuation of the selected key assigned to control the selected peripheral device.

14. The television receiver of claim 13, wherein the processor receives identification information from each of the peripheral devices connected to the data bus network during a set up mode of the network, and the providing means provides an on-screen display including the identification information received during the set up mode.

15. The television receiver of claim 14, wherein the processor generates a table associating each of the peripheral devices on the data bus network with a unique identifier.

16. The television receiver of claim 15, wherein the processor generates a second table associating the selected keys of the remote control device with the unique identifiers associated with the peripheral devices.

17. The television receiver of claim 16, wherein the data bus network comprises an IEEE 1394 network.

* * * * *